United States Patent [19]

Brager et al.

[11] Patent Number: 4,784,166

[45] Date of Patent: Nov. 15, 1988

[54] TRUCK WASHING MACHINE FOR WASHING TRAILER INTERIORS USING WATER UNDER PRESSURE AS REMOTE SOLE SOURCE OF POWER, CONTROL AND WASH LIQUID

[76] Inventors: Douglas R. Brager, 2024 W. Greenough Dr.; Randall J. Kappes, 11250 Bench Rd., both of Missoula, Mont. 59802

[21] Appl. No.: 123,690

[22] Filed: Nov. 23, 1987

[51] Int. Cl.[4] ............................ B08B 3/02; B08B 9/08
[52] U.S. Cl. ..................................... 134/50; 134/56 R; 134/101; 134/168 R; 134/172; 239/146; 239/160; 239/164; 239/176; 239/738; 239/747; 180/274; 180/305; 180/306; 60/493; 137/625.69; 137/899
[58] Field of Search ...................................... 134/44–46, 134/56 R, 57 R, 94–97, 99, 100, 101, 103, 123, 166 R, 167 R, 168 R, 169 R, 171, 172, 50; 239/146, 160, 164, 176, 738, 747; 180/274, 305, 306; 15/53 A; 60/493; 137/625.69, 899

[56] References Cited

U.S. PATENT DOCUMENTS

| | | | |
|---|---|---|---|
| 2,876,854 | 3/1959 | Tetyak | 180/306 X |
| 3,348,624 | 10/1967 | Just et al. | 180/305 |
| 3,534,746 | 10/1970 | Posner | 134/167 R X |
| 3,830,430 | 8/1974 | Hartunian | 134/45 X |
| 3,973,988 | 8/1976 | McMahan | 134/168 R X |
| 4,185,774 | 1/1980 | Tidwell | 239/738 |
| 4,309,788 | 1/1982 | Brager et al. | 15/53 A |

Primary Examiner—Harvey C. Hornsby
Assistant Examiner—Stephen F. Gerrity
Attorney, Agent, or Firm—Sughrue, Mion, Zinn, Macpeak, and Seas

[57] ABSTRACT

A hydraulic circuit and a wheeled self-propelled moveable frame provides a one-way feed of water under pressure selectively bearing a liquid soap or a liquid rinse chemical via a wind up hose mounted on a spool via a drive motor to axle to belt to clutch to shaft on the moveable frame through a multi-way directional valve to a water powered drive motor for driving the moveable frame forward and reverse relative to an open end of a vehicle body and said spool. A water cylinder changes the angle of inclination of a floor nozzle tube rotatable about its axis horizontally at the front of the moveable frame and bears a series of longitudinally spaced nozzles, when the machine travel reverses towards the open end of the vehicle body. The multiway directional valve changes the water flow direction upon impact of a sensor operatively coupled thereto and projecting forwardly of the front of the wheeled self-propelled moveable frame. The rear mounted multi-way directional valve has a plunger which is manually or otherwise depressed to change the direction of water flow and to fluid communicate a power inlet port of the directional valve to a power supply port connected to the machine drive motor to effect forward movement of the moveable frame within the vehicle body. Water under pressure supplied remotely through the hose forms the sole source of motor power, controls system components and effects washing and rinsing of the vehicle body interior.

7 Claims, 4 Drawing Sheets

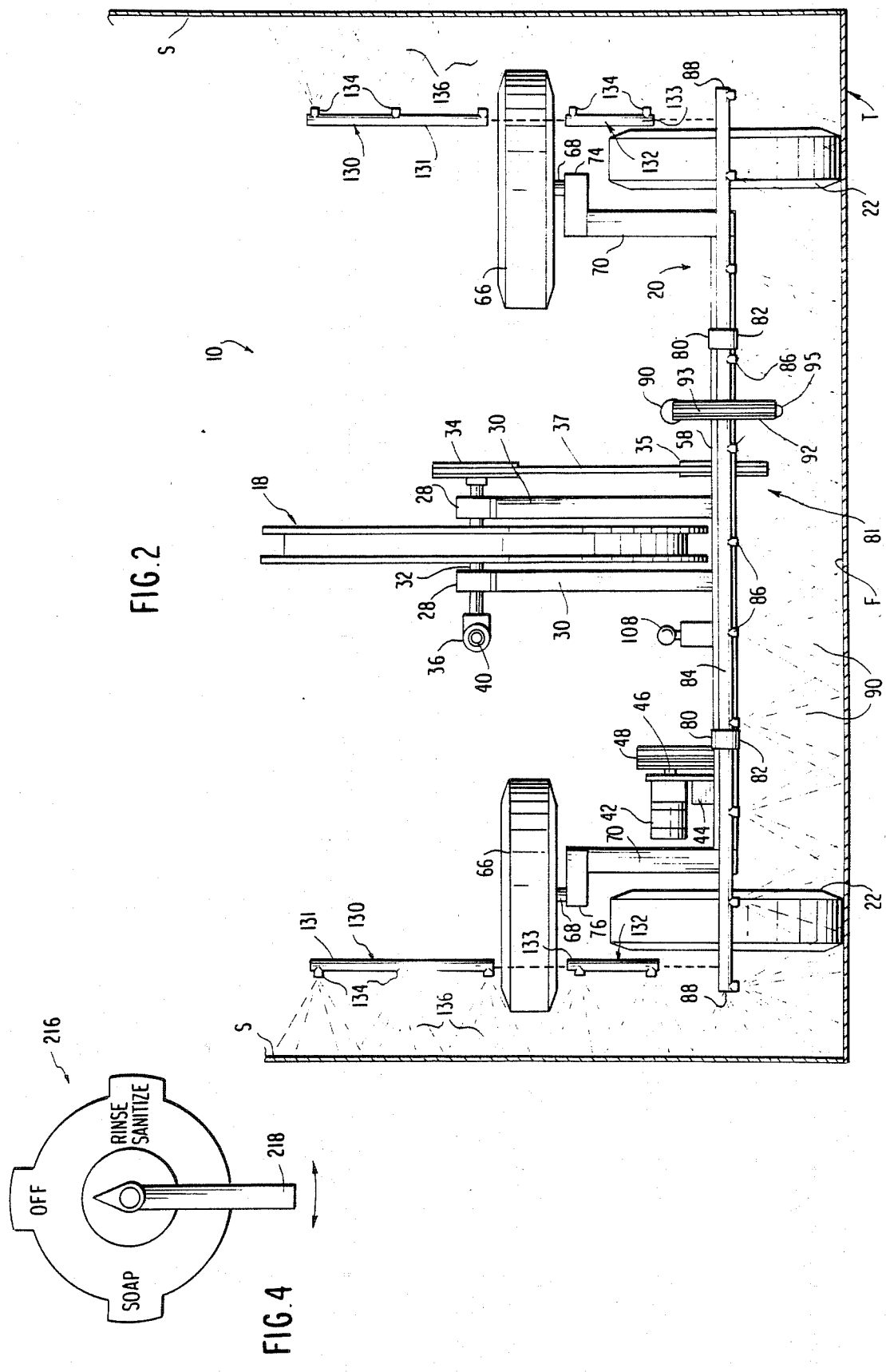

TRUCK WASHING MACHINE FOR WASHING TRAILER INTERIORS USING WATER UNDER PRESSURE AS REMOTE SOLE SOURCE OF POWER, CONTROL AND WASH LIQUID

FIELD OF THE INVENTION

This invention relates to self-contained cleaners for washing the interior surface of large trailers and like vehicle bodies and more particularly to a self-contained mobile unit in which a remote source of water under pressure is piped via a hose wound on a reel borne by the mobile unit as the sole power, control and wash liquid source for the unit.

BACKGROUND OF THE INVENTION

Various types of washing machines have been introduced to wash the interior surfaces of large tractor trailers and other vehicle bodies. Such washing machines vary. Some devices include a horizontal boom having washing heads on the free end thereof and moveable longitudinally into and out of a tractor trailer or other vehicle body, from one end thereof.

In another type washing machine, a mobile frame or wash cart is driven into the rear of the trailer from a support platform registered with the open end thereof. Such washers normally are coupled with flexible hoses which supply electric power, water and detergents from an external source to the mobile washing machine. In such devices, cable reels or spools are mounted on the mobile frame which hold the hose and effect hose takeup thereof as the mobile frame moves across the floor of the associated tractor trailer and wherein the cable reel is positively driven during reverse movement to take up the the hose as the machine reverses direction towards the open end of the vehicle body.

In particular, the applicants have developed a four-wheeled machine for the interior washing of a trailer body as set forth in their prior U.S. Pat. No. 4,309,788. The machine thereof sets on a base frame structure which supports the machine and which is provided with a drop gate at the front end thereof, to close the gap between the trailer and the base frame for the machine's entrance into the rear of the trailer. The base frame may be mounted on either a stationary dock for backup use, or on a laterally moving base for drive-by use. With a trailer positioned so that the interior washer is at the rear, open end of the trailer, operation is initiated by depressing a pushbutton control. The truck washing machine moves forward on its base allowing the drop gate to lower and to come to rest on the rear of the trailer for floor. The machine upon entering the rear of the trailer sprays soapy water on all four surfaces and scrubs the floor with rotary brushes. Detergents are injected into the water flow from a self-contained chemical tank within the four-wheeled machine frame or chassis. Washing of the interior with soapy water normally occurs during a first cycle movement from the rear of the vehicle towards the front of the trailer and reversely. Rinsing takes place during the return of the vehicle. In U.S. Pat. No. 4,309,788, as the machine exits from the trailer, it returns onto the base frame and automatically lifts the top gate as it approaches the rear of the base frame. Means are proved for automatically refilling the machine with water during the time when the trailer is pulled forwardly from the washing area and the next trailer to be washed is driven into position relative to the base frame. Such mobile, wheeled machines as known, are powered by either an electric or a hydraulic system, or a hybrid system. As a result, manufacture and maintenance costs are high, to ensure both the hydraulic and electrical system components are protected from the corrosive atmosphere on the wash cart. However, since the water, soap solutions and the like are extremely deleterious to the electrical and hydraulic controlled components, there are frequent break downs resulting in significant maintenance costs.

It is therefore a primary object of the present invention to provide a wheeled truck washing machine for the interior washing of a trailer body or the like, in which the water under pressure, supplied from a remote source to the mobile washing machine, provides exclusively, the requisite power to drive the machine into and out of the trailer body, the control fluid for reversing operation of the water powered equipment thereof, and the wash liquid, is unidirectionally supplied to the wheeled machine, requires no circulation loop and eliminates the need for electricity and/or hydraulic oil at the wheeled machine for control and function operation, thereby significantly reducing both manufacturing and maintenance costs.

SUMMARY OF THE INVENTION

The invention is directed to an improved apparatus for washing the interior of the vehicle body having an opening within an end thereof and a horizontal floor extending the length thereof. The apparatus comprises a wheeled self-propelled moveable frame, a drive motor mounted on the frame and drive means powered by the drive motor and operable to propel the wheeled, moveable frame across the floor. A hose spool is rotatably mounted on the frame and operatively coupled to the drive motor for positively rotating the spool to wind up the hose. A water spray bar system is mounted on the frame and operatively coupled to the hose with means for coupling the free end of the hose to a source of water under pressure and control means on the frame, responsive to movement of the self-propelled moveable frame for controlled operation of the drive motor and the water spray bar system.

The improvement recites the control means as comprising a multi-way directional valve responsive to a sensed position of the self-propelled moveable frame along the floor of the vehicle body. The drive motor comprises a bidirectional water driven rotary motor. Further the self-propelled moveable frame includes a hydraulic circuit coupled to the hose including means for supplying water under pressure to the multi-way directional valve for supplying water under pressure to said bidirectional, water driven rotary drive motor. Further the hydraulic circuit further includes means for dumping the water after passage through the bidirectional water driven rotary drive motor at the situs of the wheeled self-propelled moveable frame, whereby the pressure water source functions as a sole source of power for travel of the self-propelled moveable frame and responds to all operational commands for the moveable frame components, while providing adequate wash and rinse water to the apparatus spray bar system on the self-propelled moveable frame.

The spray bar system includes an elongated hollow tube mounted for rotation about its axis horizontally across the front of the wheeled self-propelled moveable frame. The rotatable tube include a plurality of radially projecting nozzles at longitudinally spaced positions along the length of the tube. A water driven linear fluid motor is fixably mounted to the self-propelled moveable frame and operatively coupled to the hollow tube for rotating the tube about its axis through a limited arc, such that the nozzles provide a spray pattern, at a first tube rotary position, in a first horizontal direction towards the trailer front wall during entry and in a second tube rotary position with the spray pattern shifted in the direction towards the opposite open end of the vehicle body from said first position and oblique to floor, as machine exits. Further the hydraulic circuit includes means for controlling the water driven linear fluid motor, such that the nozzles of the floor spray tube are automatically shifted inclined rearwardly towards the open door of the vehicle in response to said means for sensing the predetermined position of the wheeled self-propelled moveable frame along the surface of the vehicle body floor.

A sprocket mounted to the tube may be rotated by an axially projectable and retractable rod of the water driven linear fluid motor. The linear fluid motor may be a water cylinder with the hollow tube rotated through said arc determined by the extent of projection and retraction of the water cylinder rod.

The multi-way directional valve may comprise a 4-way valve having a return port, a power inlet port, and two power supply ports. The sensing means may comprise a front mounted reciprocating rod operatively engaging an axially shiftable valve member in said multi-way directional valve. The return port of the 4-way valve is open to dump discharge water under pressure returning to the directional valve after passage to at least the water powered drive motor. The water cylinder and the water powered drive motor each comprise two fluid ports and the hydraulic circuit includes conduit means for connecting one of the power supply ports of the directional valve to respective ones of the two fluid ports of each of said water cylinder and said drive motor. The conduit means further comprises means for connecting the other water supply port of the directional valve to the other of the said two ports of said water cylinder, and said drive motor. Upon setting of the axially shiftable valve member, water under pressure is supplied via said directional valve solely to the water cylinder and the drive motor to maintain the water spray pattern from the nozzles borne by the hollow rotary tube at said first position and the direction of flow into the water powered drive motor is such that the self-propelled moveable frame is driven in a forward direction and without operation of said spool motor. In response to said wheeled self-propelled moveable frame reaching said predetermined position in proximity to the front end of the truck body remote from the open end thereof, the sensor means reverses the position of the axially shiftable valve member of said multi-way directional valve to effect a change of state of the directional valve to connect the power inlet port thereof to the second pressure water supply port, thereby feeding water under pressure oppositely to said water cylinder and said drive motor. As a result, said rotatable tube is rotated to said second position and the floor nozzle spray pattern is directed obliquely and towards the open end of said vehicle body, said drive motor propels said wheeled self-propelled moveable frame in a reverse direction away from said front wall towards the open end of said vehicle body, and said spool is positively driven in a direction causing said hose to be wound up on said spool, as the self-propelled moveable frame traverses over the vehicle body floor towards the open end of the vehicle body.

One port of the multi-way directional valve may be open so that the pressured water returning from the drive motor is discharged onto the vehicle body floor, as the self-propelled moveable frame traverses the floor towards either end of the vehicle body.

A stationary base frame may be fixably mounted for alignment with the open of the vehicle body and positioned relative to the floor so as to receive the wheeled self-propelled moveable frame at the termination of movement of the wheeled self-propelled moveable frame in the direction of the open end of the vehicle body and to position said wheeled self-propelled moveable frame. when not in use. A liquid sanitizer chemical storage tank and a liquid soap storage tank may be mounted on the base frame and the source of water under pressure includes pipe means mounted to the stationary base frame and connected to the end of the hose remote from the spool. A water solenoid valve may be provided within the pipe means for selectively shutting off the connection between the hose and the source of water under pressure. Means may be provided for selectively, operatively connecting the liquid sanitizer tank and the liquid soap tank to the pipe means downstream of the solenoid water shutoff valve. Means to cause selectively, a liquid sanitizing rinse solution or liquid soap solution to be fed with the water under pressure through the hose to said wheeled self-propelled moveable frame may be provided for cleaning and rinsing of the vehicle body during cyclic traversal of the wheeled self-propelled moveable frame bidirectional over the length of the floor of the vehicle body.

The selection means may constitute the solenoid water shut-off valve within the pipe means and a pair of conduits coupled at one end to the pipe means downstream of the solenoid valve, with the pair of conduits having opposite ends thereof disposed internally within the liquid sanitizer chemical tank and the liquid soap tank, respectively, and wherein, said pair of conduits include pumps, with said selector switch comprising a 3-position switch moveable between "soap" and "rinse-sanitize" positions, through an off-position intermediate thereof.

The rear mounted multi-way directional valve may include a manually shiftable handle or depressible plunger for changing the state of said switch and for initiating feed of a pressured water to a first outlet port of the 4-way directional valve. Upon contact with the wall of the end of the sensing rod remote from the multi-way directional valve, the reverse movement of the sensing rod causes a change of state of the rear mounted multi-way directional valve. As a result thereof, water under pressure switches from the power inlet port to said first supply port, to said second supply port thereby reversing the flow of water under pressure to said water cylinder and the drive motor. During reverse rotation of the drive motor the spool is positively driven in a direction via a one way clutch bearing to take up the water supply hose carried thereby. During forward rotation of the drive motor, the spool slips to allow hose play out from the reel towards the source of pressure water.

BRIEF DESCRIPTION OF THE DRAWINGS

FIG. 2 is a schematic, front elevational view thereof.

FIG. 4 is a plan view of a selector switch employed as an element of the base frame structure for supplying water under pressure to the truck washing machine of FIGS. 1-3 inclusive.

DETAILED DESCRIPTION OF THE PREFERRED EMBODIMENT

It should be understood, that the truck washing machine of the present invention is similar to that set forth in our earlier U.S. Pat. No. 4,309,788, and that it preferably operates with a base frame structure similar to that disclosed and claimed in said patent. The content of U.S. Pat. No. 4,309,788 is specifically incorporated herein by reference, and reference to said patent may be had for a better understanding of the invention described and claimed herein, which constitutes an improvement in the art.

Figure 1:
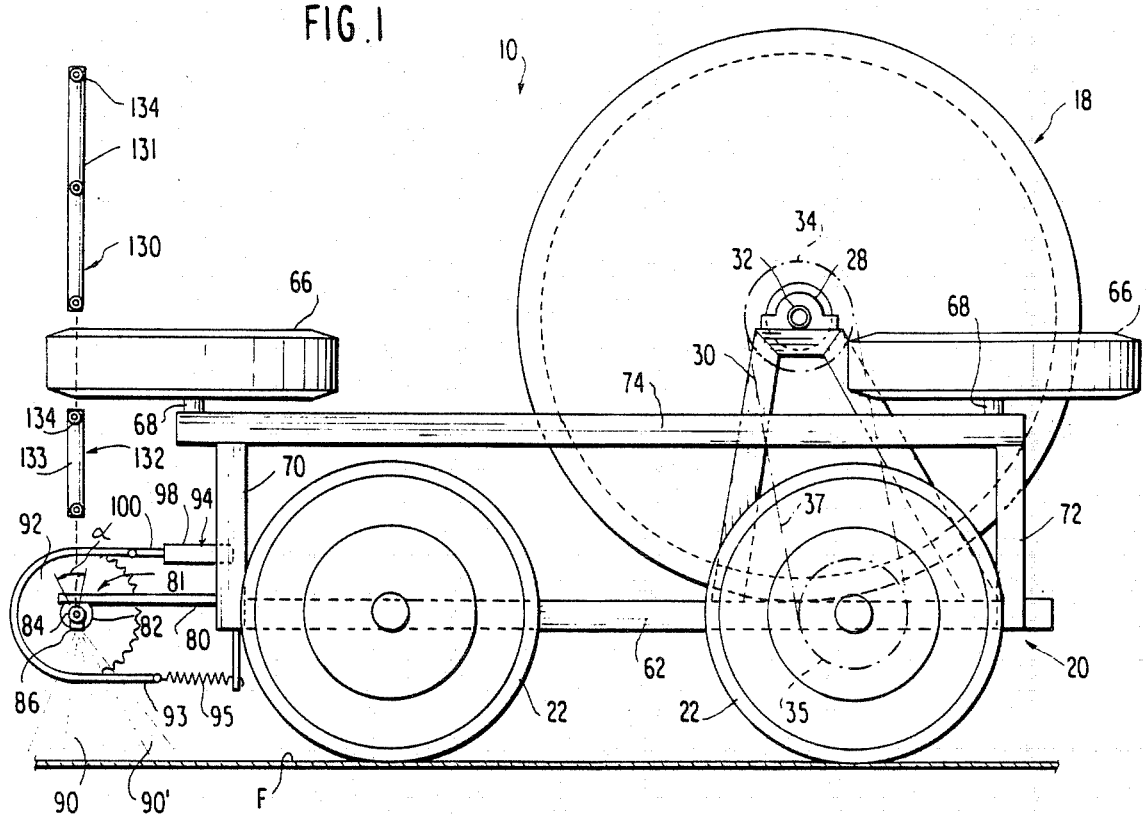
FIG. 1 is a schematic, side elevational view of a truck washing machine forming a preferred embodiment of the present invention.
Figure 5:
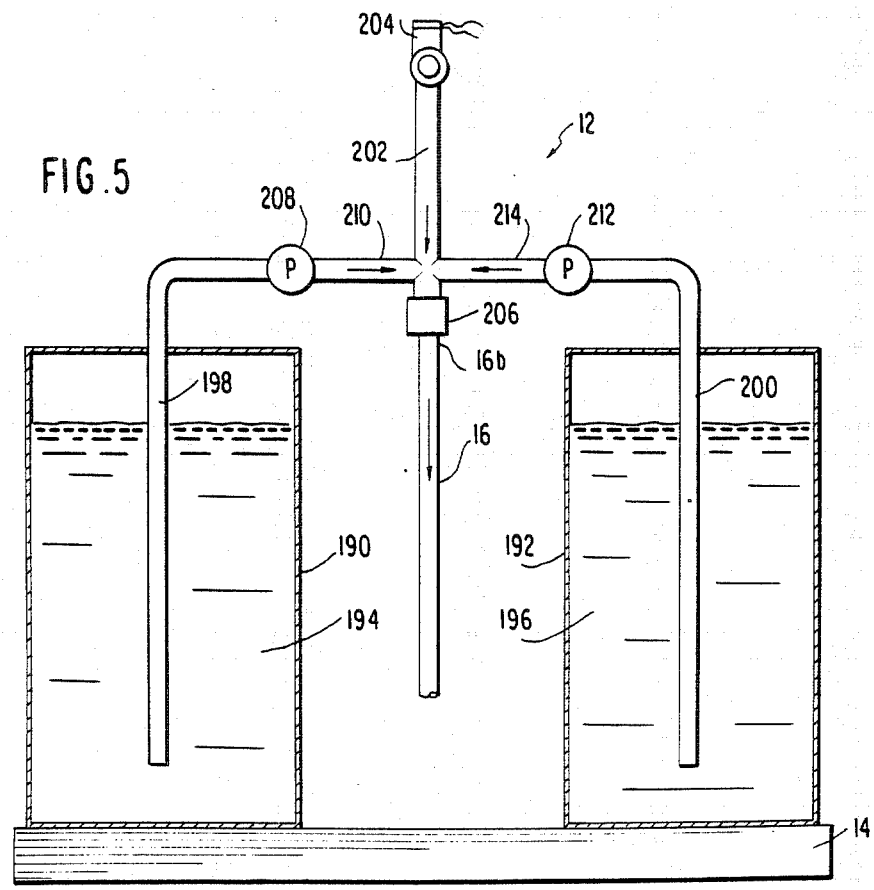
FIG. 5 is a schematic, hydraulic diagram of components of the base frame structure.
Figure 3:
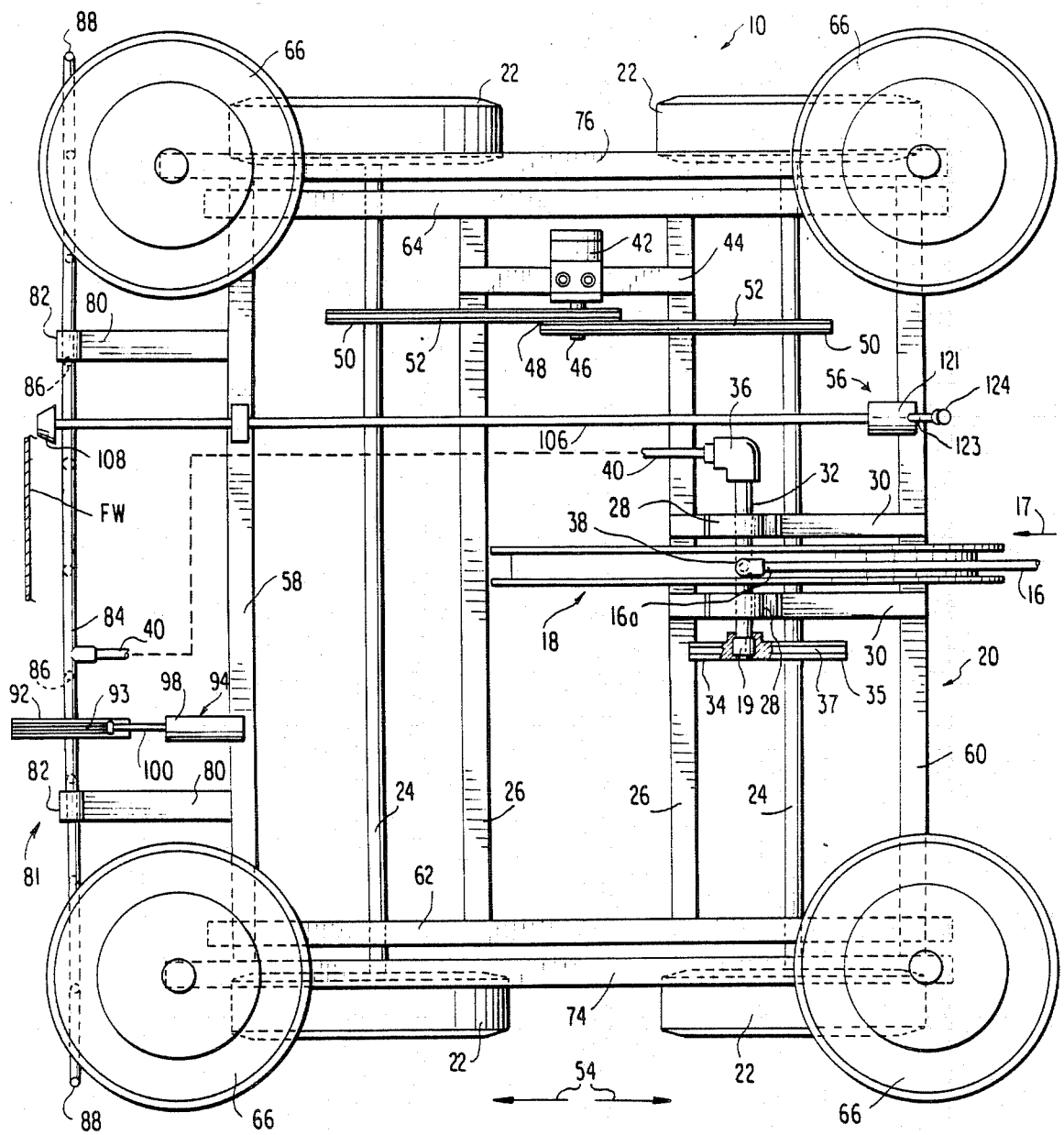
FIG. 3 is a schematic, top plan view thereof.

In that respect, and referring now more specifically to the drawings herein, in FIGS. 1, 2 and 3, the truck washing machine or wash cart, indicated generally at 10, is powered and controlled solely by a remote source 17 of water under pressure, which water is preferably delivered from a base frame structure, indicated generally at 12, FIG. 5 and mounted to a fixed platform or the like 14, via a flexible hose which is physically coupled to a spool indicated generally at 18 and mounted to an open frame or chassis 20 of the truck washing machine 10, FIG. 3.

The truck washing machine 10 takes the form of a relatively small, four-wheeled vehicle having wheels 22 mounted on paired axles 24 on the open frame or chassis 20. The chassis or frame 20 is of open rectangular form including longitudinal side bars 62, 64, front cross bar 59, rear cross bar 60 and intermediate transverse struts or bars 26. The spool 18 for hose 16, is mounted for rotation about its axis via paired journals or bearings 28 which are mounted on brackets 30 forming a part of the vehicle frame 20. The spool 18 is mounted on a hollow tube or axle 32 by a one way clutch and bearing assembly 19 and axle 32 is coupled at one end to a bracket mounted driven pulley 34. Such assembly 19 may be a Torrington Model FCB-30 assembly. The opposite end of the axle 32 is coupled to a water swivel 36 and the end 16a of the hose connects to the hollow tube 32, at 38, such that a water flow under pressure in conduit 40 is available from remote source 17 to the truck washing machine 10 for power, control and wash functions.

In the schematic representation FIG. 3, the machine 10 is further equipped with a vehicle drive motor 42 which is fixably mounted to an underlying beam 44, which beam 44 extends between the paired intermediate struts or bars 26. The drive motor 42 includes a projecting shaft 46 which is coupled to a pair of drive pulleys 48 and rotatable about the axis of the motor shaft 46. Driven pulleys 50 are fixably mounted to respective axles 24, and V-belts 52 couple drive pulleys 48 to the driven pulleys 50 on the respective axles 24, such that by energizing drive motor 42, the truck washing machine 10 may be driven bidirectionally, as indicated by arrows 54, FIG. 3. In the schematic representation FIG. 3, a 4-way directional valve, indicated generally at 56 is shown as fixably mounted to the intermediate strut or bar 26 forming a portion of the frame 20. The frame 20 may be formed of metal I beams or the like welded together in a manner depicted in FIG. 3.

In order to guide the truck washing machine 10 as it moves longitudinally in the direction of the double headed arrow 54, FIG. 3, four guide wheels 66 are mounted at respective corners of the open frame 20 by way of shafts 68 for rotation about vertical axes such that the peripheries of the wheels 66 may make contact with the opposite side walls of the trailer (not shown) during machine travel. As seen in FIG. 1, at opposite sides of the machine, vertical risers 70, 72 extend upwardly from the side bars 62, 64 and are joined at their upper ends by guide wheel support bars 74, 76. The axles or shafts 68 are fixably mounted at their lower ends to respective ends of the guide wheel support bars 74 and the guide wheels 66 rotate about their respective axes on the shafts or axles 68. Two inverted V-shaped brackets 30 mount the hose spool or reel 18 as clearly seen in the schematic view of FIG. 1.

To effect cleaning, the truck washing machine 10 mounts a water spray system indicated generally at 81 at the forward end of the machine 10. In that respect, a pair of struts 80 are welded to front cross bar 58 and project forwardly of wheels 22. Struts 80 terminate in sleeve bearings 82, rotatably mounting a hollow pipe or tube 84 for rotation about the tube axis with the tube 84 being horizontal and parallel to the frame front cross bar 58. Tube 84 connects to swivel 36, via conduit 40, FIGS. 3, 6. A plurality of floor spray nozzles 86 are mounted to the tube 84, or integrated therein, at longitudinally spaced positions with a pair of additional spray nozzles 88, mounted respectively at opposite ends of the tube 84. As indicated in FIG. 2, overlapping water sprays are produced as at 90 which, in the case of the nozzles mounted to tube 84 may be selectively directed horizontally forward or at an oblique angle, rearwardly via water cylinder 94.

In that respect, a sprocket 92, is welded to tube 84 to rotate about its axis which is coaxial with tube 84. A chain 93 is coupled at one end to a plunger or shaft 100 projecting axially outwardly at one end of the water cylinder, cylindrical casing 98. The opposite end of the chain 93 is coupled to a spring 95 whose other end is fixed to front frame cross bar 58 with the chain 93 engaging sprocket 92. As a result, the sprocket 92 may be rotated through an angle α, FIG. 1, limited to the length of the stroke of the piston rod 100 of water cylinder 94. As indicated in FIG. 1, this displaces the spray patterns 90 of the various floor spray nozzles 86, fixed to tube 84, from being directed horizontally forward to one rearwardly oblique spray pattern, indicated at 90', FIG. 1 through the angle α. In effect therefor, with the spray pattern at 90' and the truck washing machine 10 reversing its direction and moving backwardly, out of the trailer, the water sprays emanating from tube 84 tend to rinse the interior of the truck body and displace solids and soapy liquid rearwardly towards the opening within the truck body originally entered by the truck washing machine.

The content of the hydraulic circuit diagram, FIG. 6, of the truck washing machine 10 will be discussed in detail, in conjunction with the overall operation of the machine, hereinafter.

At the rear end of the truck washing machine frame 20, and specifically on the rear cross bar 60, is mounted the multi-way directional valve 56 which includes a cylindrical housing 121 from which projects manually shiftable plunger or handle 123 terminating in a radially enlarged head 124 which is depressed to initiate forward movement of the vehicle. The multi-way directional valve 56 is mounted so that the plunger head 124 may be selectively manually depressed so that the flow direction of the directional valve 56 changes. This action, as will be seen hereinafter, initiates water flow under pressure, as per arrow 17 through hose 16 to the truck washing machine 10 and thus initiates operation of drive motor 42. A long actuating rod 106 extends axially from the other side of housing 121 and is provided with an enlarged bump plate 108 on the end of rod 106 which projects beyond the front of the machine. Rod 106 may be integral with an axially shiftable valve member 112 within multi-way directional valve 56, with the opposite end of valve member 112 integral with manual handle 123, FIG. 6.

The front spray assembly 81 consists of further spray nozzles 134 for spraying the lateral side walls S of the truck body, within which the unit 10 operates. These additional spray nozzles 134 are mounted to respective vertical spray assemblies 130, 132 which are shown schematically in FIG. 2 as mounted to opposite sides of the machine 10 at the forward end, and in line with the rotary tube 84, producing additional water sprays 136. The nozzles 134 are mounted to vertical tubes 131, 133, respectively of spray assemblies 131, 132 to ensure high intensity water spray patterns impacting the side walls S of the trailer in addition to sprays 90 impacting the floor F of the truck body T. If desired, the truck washing machine 10 may be provided with one or more side wall brushes (not shown), and one or more floor brushes (not shown) which are waterpower driven to scrub and clean the vehicle body to be washed by sprays 90, 136 in a similar manner to that set forth in U.S. Pat. No. 4,309,788. In that case, the motors which drive the various brushes may be identical to or similar to the water-driven motor 42 for driving the four wheels 22 of the truck washing machine 10.

In contrast to the prior art as exemplified by our U.S. Pat. No. 4,309,788, the truck washing machine 10 of the present invention employs a source of water under pressure as the sole source of; power for travel, for initiating all operational commands on the machine, and power for ancillary functional mechanisms other than for machine transport. The water as per arrow 17 is to the machine via the single hose 16 and the water flow 17 is one way. Unlike complex hydraulic circuits, there is no water circulation loop back to the water source 17. At the machine 10, the water flow is divided and used to power the drive motor 42 and for operational control or command of such machine components as the water cylinder 94. In addition the single water source 17 provides the wash and rinse water to the front spray bar system 81. In that respect, and relative to the operation of the machine, reference may be further had to FIGS. 4, 5 and 6.

FIG. 5 is a hydraulic schematic diagram of the components at the fixed base frame 12 from which the truck washing machine 10 initiates its movement into the truck body T, and across the floor F of the same, from the open rear of the truck body to the front wall F and its reverse movement back to the open rear, twice to complete a wash cycle and then a reverse cycle. FIG. 4 is a plan view of the selector switch for accomplishing the automatic operation of the machine by the simple expedient of manual movement of the selector switch to effect a first cycle of operation in which soap is fed from one storage container or barrel to the truck washing machine 10, through the hose 16 and via second cycle, rinse-sanitize liquid from another container or barrel at the fixed base frame structure 12, for spraying at machine 10, via the same water supply hose 16, as indicated by arrow 17.

Figure 6:
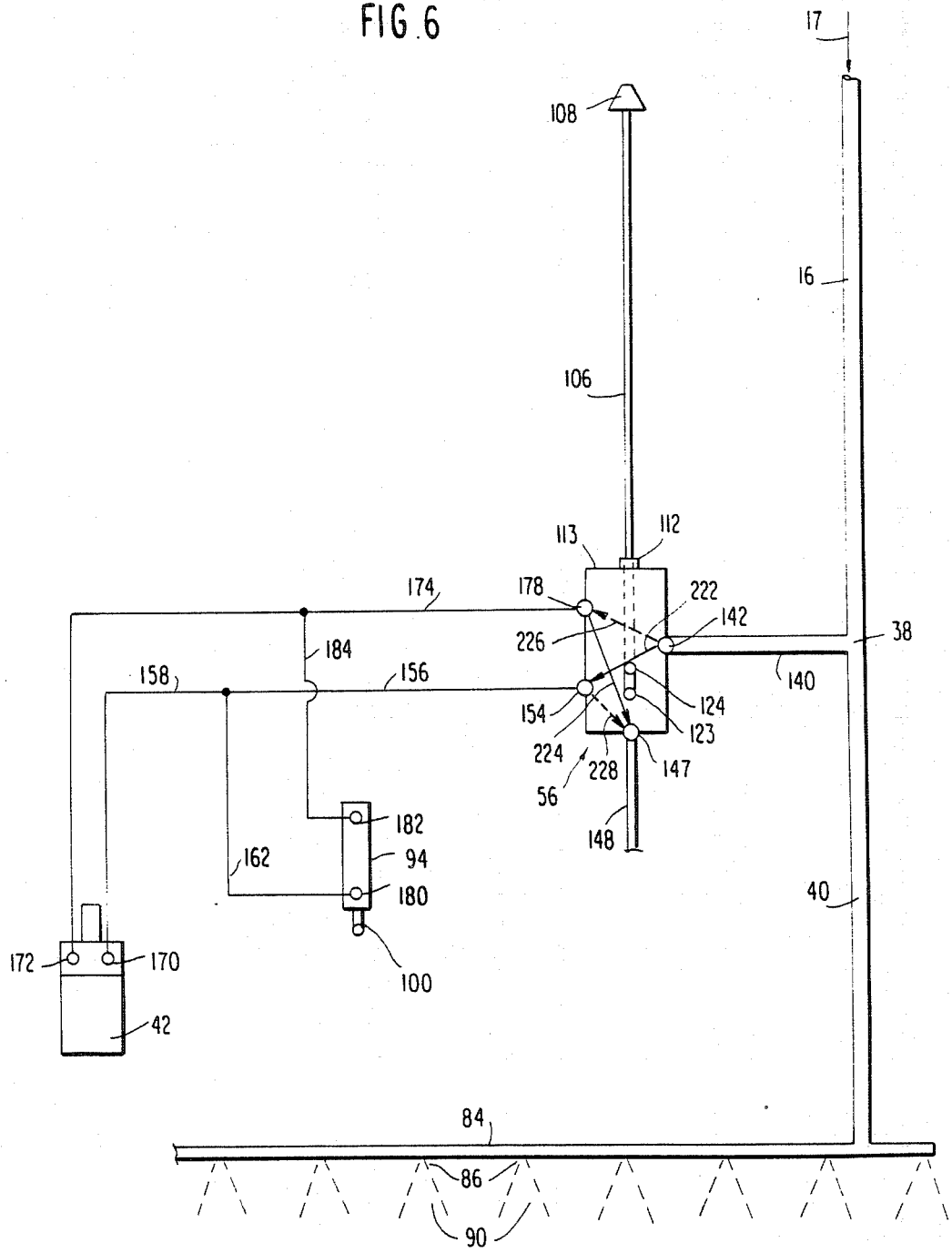
FIG. 6 is a schematic, hydraulic diagram of the components of the truck washing machine illustrated in FIGS. 1-3 inclusive.

FIG. 6 is a hydraulic schematic view of the water powered equipment within the truck washing machine 10 (the mobile portion of the apparatus).

Referring to FIG. 6, which shows the heart of applicants' invention, schematically the hydraulic circuit illustrates hose 16 as feeding water under pressure, from a source indicated by arrow 17. Where the hose 16 connects to the reel or spool 18 at machine 10, and through connection 38, a branch line or conduit 140 branches from the conduit 40 leading to the front floor nozzle tube 84. Conduit 140 leads directly to the bi-directional valve 56.

The 4-way valve 56 has four main ports. Port 142 is the power fluid inlet port for water under pressure from conduit 140. Ports 154 and 178 functions alternatively as power supply ports and return flow ports for the 4-way valve, providing water under pressure via lines 156, 174, respectively to drive motor 42 and the water cylinder 94. Port 147 of the 4-way valve 56 is a power fluid return port and is left open via unconnected line 148. Under these conditions the water under pressure, which functions as the drive or the motive fluid for system components 34, 42 and 94, after performing the desired functions, is simply dumped at the location of the truck washing machine 10, via open port 147. Since water powers all of the motors and operates the controls, there are no electrical or hydraulic mechanisms or electrical or hydraulic circuits or the like at the truck washing machine 10. The necessity to circulate hydraulic fluid in a continuous power loop and the feed of electricity to the truck washing machine are eliminated. Additionally, the dumping of water at the situs of machine 10 provides flushing liquid tending to rinse the soap solution applied during movement of the machine 10 into and out of the truck body during first cycle. Reverse tilting of the floor nozzle sprays 90 also facilitates flushing. Water flows through branch conduit 143 to port 142. Port 142 functions as the power fluid inlet port for the 4-way valve 56.

With handle 123 in its retracted position, the machine is at rest on base frame 12 in similar fashion to that of prior U.S. Pat. No. 4,309,788.

By operation of manual selective switch 216, FIG. 4 from the off-position shown to either "soap" or "rinse-sanitize" position, 90 degrees thereto, energization of the water solenoid valve 204 occurs, FIG. 5, to cause water to flow from source 17 to power fluid inlet port 142 of the 4-way valve 56, via hose 16.

Under conditions shown in FIG. 6, with handle 123 manually depressed, a connection is made between conduits 140 and 156 through inlet port 142 and port 154, thereby completing a fluid connection internally of the 4-way valve 56 as indicated by solid line arrow 222 between power inlet port 142 and port 154. Port 178 is connected to the drive motor 42 via line 174 and port 172 of said drive motor 42 and functions as a fluid return port. A second port 170 of the drive motor is connected via line 158 to line 156 which connects to the 4-way valve 56 via port 154. Thus, immediately upon the shifting of the selector switch 216 via handle 218 to either "soap" or "rinse-sanitize" position, from the off-position, flow is intruded from port 154 to motor 42 and the water powered drive motor operates to drive the truck washing machine 10 in a forward direction.

The water returning from the drive motor 42 is dumped from the frame 20 via the open return port 147, as indicated by full line arrow 224, FIG. 6. Additionally, conduit 162 which branches from line 156 and which connects to port 180 of the water cylinder 94 causes the water cylinder piston rod 100 to retract to the position shown in FIG. 6. Chain 93 is pulled against the tension of coil spring 95, rotating sprocket 92 and tube 84 such that the spray patterns 90 of water from nozzles 86 are directed horizontally forward, parallel to the floor F of the truck body. Line 162 connects the second port 180 of water cylinder 94 to the line 156. Water flow from water cylinder 94 returns via port 154 to the 4-way valve return port 147 for dumping. Under conditions the spool rotation is not affected since the spool rotates only on reversal the machine via a one way clutch connection to its supporting tube to rewind the water hose 16 under conditions in which the water entering the 4-way valve 56 through the power inlet port 142 is required to be fed to power supply port 178.

Those conditions are shown schematically by the two dotted line arrows 226, 228, FIG. 6. Such action occurs when the bump plate 108 mounted to the outboard end of reversing rod 106 contacts the front wall FW of the truck body T to shift the valve member or plunger 112 axially within valve casing 113.

The flow direction of the 4-way valve shifts such that flow in valve 56 is in the direction dotted line arrows 226, 228. Water flow is from the power inlet port 142 to supply port 178 and through or conduit 174. The flow of water under pressure splits, a portion of the flow passing from line 174 through line 184 to port 182 of the water cylinder 94. This shifts the plunger 100 causing is to project and rotate sprocket 92, FIGS. 1 and 3, such that the nozzle spray patterns 90' are oblique rearwardly for each nozzle 86 of tube 84, against the floor F of the truck body. The flow to water cylinder 94 returns via line 184 and line 174 to the 4-way valve 56 and, upon entering port 178, is directed to the open return port 147 which discharges the water on to the floor F of the truck body.

Additionally, water flow passes from line 174 to port 170 to the drive motor 42 reversing the drive through the 52 to drive pulleys 50 thereby reversing the of rotation of the drive wheels 22 on the truck washing machine 10. The truck washing machine machine then changes from the forward direction to the reverse direction as indicated by arrow heads 54, FIG. 3. Further, the water supply to the drive motor 42 returns via line 156 and is dumped onto the truck floor via open port 147 of the 4-way valve 56.

Under these upon reverse rotation of drive motor 42, the spool 18 is rotated during reverse drive of machine 10 to rewind the water hose -6 on the reel or spool 18. Rotation of spool 18 occurs due to the nature of driven pulley 3 fixed to tube 32 via a needle bearing 19 on tube 32 for the spool driven pulley 34, which functions as a one-way clutch. A drive pulley 35 fixed to axle is connected to driven pulley 34 by a V-belt 37. Spool 18 rotates at an appropriate speed determined by the RPM of the drive motor 42 so that the takeup of the hose matches the linear speed of the truck washing machine 10 in moving towards the open end of the truck body.

Referring to FIGS. 4 and 5, it should be kept in mind that the invention differs from that of our prior U.S. Pat. No. 4,309,788 to a limited degree at the base frame structure 12, primarily in terms of adding the soap or rinse-sanitize chemicals to the supply of water 17 at the fixed base frame structure rather than at the mobile truck washing machine 10. In that respect, the base frame structure platform 14 supports, in side by side position, a vertically upright barrel 190 which holds a liquid sanitizer 194 and a second barrel 192 which houses liquid soap 196. Projecting interiorly into respective barrels 190, 192 are liquid sanitizer feed pipe 198 and liquid soap feed pipe 200, respectively. Coupled into liquid sanitizer feed pipe 198 is a rinse pump 208 which is preferably electrically driven by an electric motor (not shown) which may be integrated with the pump 208. Thus, when the pump 208 is energized, a supply of liquid sanitizer is positively pumped via pump 208 into a common conduit or line 202 connected to the water source 17, such that a liquid sanitizer rinse chemical is added to the water. The common conduit 202 connects via coupling 206 to end 16b of the hose 16 whose opposite end 16a is coupled to the spool 18, FIG. 1 for winding thereon. The conduit 202 includes a water solenoid valve 204 which is normally shut but which opens in response to energization of a solenoid coil (not shown) of such valve. When open the flow of water under pressure 17 is from source 17 as indicated by the arrows, FIG. 5, through the conduit 202 and hose 16.

To the opposite side, the liquid soap feed line pipe 200 incorporates a soap pump 212, which pump is electrically motor-driven by a motor (not shown) to selectively feed liquid soap as indicated by arrow 214 to the stream of water under pressure from source 17.

To effect that action, the handle 218 of the selector switch is initially rotated counterclockwise, 90 degrees, from OFF so that it points to the position defined by the legend SOAP, from its normal position with the handle pointing vertically upwardly, at OFF. Under these conditions, the water solenoid valve 204 is energized, water flows as indicated by the arrows through the hose 16. Simultaneously soap pump 212 is energized from a common electrical source feeding to the water solenoid valve so that a supply of liquid soap is fed into the water stream through hose 16 to the truck washing machine 10.

The operation of the machine follows closely in terms of sequence of washing steps as set forth in our earlier U.S. Pat. No. 4,309,788. As the washing machine 10 exits the base frame apparatus 12 an automatic drop gate (not shown) is lowered to bridge the gap between the base frame apparatus and the rear floor F of the trailer body T to be washed. The machine 10 travels down the length of the trailer continuously applying soapy water to at least three surfaces of the trailer interior. Simultaneously, if desired, scrubbing brushes may be mounted to machine 10 in the manner of U.S. Pat. No. 4,309,788 and may be positively driven by water powered motors similar to motor 42 as described therein. Upon the machine reaching the front wall FW of the trailer body, bump plate 108 impacts against front wall FW and is driven rearwardly to shift the position of valve member 112 to change the water flow direction of the front mounted 4-way directional valve 56. As a result, the direction of operation of the water powered drive motor 42 changes, causing the retracted plunger or shaft 100 of the water cylinder 94 to be projected and to shift the soapy water spray pattern 90 of nozzles 86 from forward and horizontal, to downward and oblique rearwardly at 90' to flush the soapy water rearwardly toward the open end. Simultaneously, positive rotation of the spool 18 occurs during the reverse movement of the machine 10, to rewind the water hose 16 which is played out as the machine moves in its forward direction along truck body T floor F via one way clutch 19.

When the truck washing machine 10 reaches the rear of the trailer body, the operator terminates drive by operation of selector switch 216. After two cycles of machine operations the machine is caused to roll back onto base frame 12 traveling over the drop gate, to close the gate behind it and the rearward travel of the truck washing machine is terminated again by manual pivoting of selection switch 216.

In causing the truck washing machine 10 to move in its forward direction, two initial manual inputs are employed in the illustrated embodiment, although it is anticipated that the machine could be further automated. First, the selector switch manual handle 216 must be shifted from off-position to the "soap" position to cause electrical energization of the water solenoid valve and energization of the motor associated with the soap pump 208. Additionally, the state of the 4-way directional valve 56 must be set up by depression or shift handle 123 to cause water under pressure from source 17 to pass from the power inlet port 145 to power supply port 178. Additionally, after the forward and reverse movement of the truck washing machine 10 through the truck body at the end of the wash cycle, the truck washing machine operation is momentarily terminated by manual turning of the selector switch handle from the "soap" position to the off-position or automatically instantaneously shut down.

Preferably, operation of the truck washing machine 10 is under semi remote control and the truck washing machine 10 traverses twice the full length of the trailer floor in both directions. The first is on a soap cycle and a second on a rinse cycle. A soap application is effected, both in the forward and the reverse directions of movement of the truck washing machine. When the machine returns to the base frame structure 12, the operator first turns the selector switch handle 218 to the off-position and the machine stops. Plunger 123 is then depressed and handle 219 pointed to the "Rinse-Sanitize" legend resulting in a second forward and reverse travel of the truck washing machine 10, effecting a similar sequence of operation. Such action may be fully automated through two full cycles. The difference in the second cycle is that the water supply 17 receives a liquid sanitizer chemical from the liquid sanitizer tank or barrel 190 to create rinse liquid to rinse the interior of the truck body with suitable disinfectant. In the illustrated embodiment, in each instance, prior to initiating movement in a forward direction, the handle 123 must be depressed from the position shown in FIG. 3 to permit flow through the 4-way directional valve 56.

As soon as the washing of the interior of the trailer is completed, the trailer may be driven forwardly away from the base frame apparatus and a second trailer may be driven rearwardly towards and in alignment therewith and the washing process repeated on the second trailer by operation of the truck washing machine 10 in the manner described above.

Changes may be made to the system and to the truck washing machine 10, constituting the major element of the system. For instance, when the customer has a strong water source the water pumps may be eliminated and the pressure from the available source will operate the machine. Further, the liquid sanitizer and liquid soap can be fed under aspiration into the water stream emanating from source 17 eliminating the need for a rinse pump and soap pump.

From the above, it may be appreciated that the truck washing machine of the present invention has major advantages involving a significant reduction in manufacturing costs over currently known machines of this type and may amount to a 50% reduction in such such costs. The maintenance costs may be reduced by as much as 90% by the elimination of electrical and hydraulic power and control components from the corrosive atmosphere of the truck washing machine or wash cart 10. Further, the sequence of operation is significantly simplified over that of our prior machine and limited to pressure water actuated components. The machine 10 is started by a simple expedient of pushing open a water valve with water then directed through directional valve 56 to a drive motor 42 to power the machine 10 forward. Upon reaching the front of the trailer, reversing occurs via bump plate 108 which is impact actuated to physically shift the valve member 112 to the 4-way directional valve 56, thereby causing the directional valve 56 to reverse the flow of water through the drive motor 42 and thereby reversing the direction of the machine travel while reversely displacing the spray pattern 90 of the floor spray nozzles through water cylinder 94 and initiating rotation of the spool 34 for winding up the hose 16 carried by the hose spool 18 on the machine itself.

The foregoing is considered as illustrative only at the principals of the invention. Further, since numerous modifications and changes will readily occur to those skilled in the art, it is not desired to limit the invention to the exact construction and operation shown and described, and accordingly all suitable modifications and equivalents may be resorted to, following within the scope of the invention.

What is claimed is:

1. In an apparatus for washing the interior of a vehicle body having an opening within an end thereof and a horizontal floor extending the length thereof, said apparatus comprising;

a wheeled self-propelled moveable frame, a drive motor mounted on said frame, a drive means powered by said drive motor and operable to propel said wheeled, moveable frame across said floor, a hose spool rotatably mounted on said frame, a hose coupled at one end to said spool and having an opposite free end, means for operatively rotating said hose spool for positively winding up said hose, a water spray bar system mounted on said frame and operatively coupled to said hose at said one end, means for coupling the free end of said hose to a source of water under pressure, and control means on said frame and responsive to movement of said self-propelled moveable frame for controlling operation of said frame drive motor, said hose spool rotating means and the water spray bar system, the improvement wherein:

said control means comprises a multi-way directional valve, means coupled to said multi-way directional valve responsive to a sensed position of said self-propelled moveable frame along said floor of said vehicle body for changing the direction of water flow through said valve, said drive motor comprises a bidirectional water driven rotary motor, and wherein, said self-propelled moveable frame includes a hydraulic circuit coupled to said one end of said hose and including; means for supplying water to said multi-way directional valve for selectively supplying water flow in either of two direction to said bidirectional water driven rotary drive motor for reversing rotation thereof, and further means for dumping said water after passage to said bidirectional water driven rotary drive motor at the situs of said wheeled self-propelled moveable frame whereby, said pressure water source functions as a sole source of power for travel of said self-propelled moveable frame, all operational commands for said moveable frame, while providing adequate wash and rinse water to the apparatus spray bar system on said self-propelled moveable frame.

2. The apparatus as claimed in claim 1, wherein, said spray bar system includes a elongated hollow floor spray tube mounted for rotation about its axis horizontally across the front of said wheeled, self-propelled moveable frame, said rotatable tube including a plurality of radially projecting nozzles at longitudinally spaced positions along the length of the tube, and a water cylinder is fixably mounted to said self-propelled moveable frame and operatively coupled to said hollow tube for rotating said tube about its axis through a limited arc, such that said nozzles provide spray patterns at a first tubular rotary position in a direction horizontal and parallel to the floor and towards the direction of the front end of the wheeled self-propelled moveable frame and at a second position rotated obliquely in direction towards the rear of said moveable frame from said first position, and wherein said hydraulic circuit further includes means for connecting said water cylinder to said multi-way directional valve, such that the spray pattern may be inclined rearwardly towards the rear of the moveable frame in response to said sensing means sensing said predetermined position of said wheeled self-propelled moveable frame along the surface of said vehicle body floor.

3. The apparatus as claimed in claim 2 wherein, said means for operatively coupling said hollow tube to said water driven linear fluid motor comprises a sprocket mounted to said tube for rotation about its axis coaxially with said tube and said water cylinder includes an axially projectable and retractable rod having an outboard end coupled to a chain engaging said sprocket whereby, said hollow tube is rotated through an arc determined by the extent of projection and retraction of said water cylinder rod.

4. The apparatus as claimed in claim 2 wherein, said multi-way directional valve comprises a 4-way valve having a return port, a power inlet port, and two power supply ports, said hydraulic circuit comprises means for supplying water under pressure to the inlet port of said 4-way directional valve, said return port is open to dump water under pressure returning to the directional valve after passage at least to said water cylinder and said water powered drive motor and said water cylinder each comprise two fluid ports, wherein said hydraulic circuit includes conduit means for connecting one of said power supply ports of said directional valve to respective ones of said two fluid ports of each of said water cylinder and said drive motor and wherein said conduit means further comprises means for connecting the other water supply port of said directional valve to the other of said two ports of each of said water cylinder and said drive motor and wherein said 4-way directional valve includes a valve member shiftable between first and second positions for reversing flow from said outlet ports to said water cylinder and said drive motor such that, by selective setting of said valve member, water is supplied via said directional valve solely to said water cylinder and said drive motor to maintain said water spray patterns from said nozzles born by said hollow rotary tube at said first position and the direction of flow into the water powered drive motor such that the self-propelled moveable frame is driven in a forward direction and without powered rotation of said spool motor, and wherein, in response to said wheeled self-propelled moveable frame reaching said predetermined position in proximity to the front end of the truck body remote from the open end thereof, sensing means at said front mount operatively coupled to said directional valve effects a change of water flow through said 4-way directional valve to connect the power inlet port thereof to the second pressure water supply port thereby feeding water oppositely to said water cylinder and said drive motor whereby, said rotatable tube floor nozzle spray patterns are shifted to said second position directed obliquely towards the rear end of said moveable frame, and said drive motor propels said wheeled self-propelled moveable frame in a reverse direction away from said front wall towards the open end of said vehicle body and said spool is positively driven in a direction causing said hose to be wound up on said spool as the self-propelled moveable frame traverses over the vehicle body floor towards the open end of the vehicle body.

5. The apparatus as claimed in claim 1, further comprising a stationary base frame fixably mounted for alignment with the open end of said vehicle body and positioned relative to said floor so as to receive said wheeled self-propelled moveable frame at the termination of movement of said wheeled self-propelled moveable frame in the direction of said open end of said vehicle body and to position said wheeled self-propelled moveable frame when not in use, a liquid sanitizer chemical storage tank on said base frame, a liquid soap storage tank on said base frame, and wherein said source of water includes pipe means mounted to said stationary base frame and connected to the end of said hose remote from said spool, a solenoid water shut off valve within said pipe means for selectively shutting off the connection between said hose and said source of water and means for selectively, operatively connecting said liquid sanitizer tank and said liquid soap tank to said pipe means downstream of said solenoid water shutoff valve, and means to cause selectively, a liquid soap solution or a liquid sanitizing rinse solution to be fed with said water through said hose to said wheeled self-propelled moveable frame for cleaning and rinsing of said vehicle body during traversal of wheeled self-propelled moveable frame bidirectionally over the length of the floor of said vehicle body.

6. The apparatus as claimed in claim 5 wherein, said selection means includes said solenoid water shut-off valve within said pipe means, a pair of conduits coupled at one end to said pipe means downstream of said solenoid water shutoff valve, and said pair of conduits have opposite ends thereof disposed internally within said liquid sanitizer chemical tank and said liquid soap tank, respectively, wherein, said pair of conduits include respectively a rinse pump and a soap pump, and wherein said selector switch comprises a 3-position switch moveable between "soap" and "rinse-sanitize" positions through an "off" position intermediate therebetween, whereby, movement of the selector switch from a normal "off" position to either "soap" or "rinse-sanitize" position automatically causes the water solenoid valve to open and one of a rinse pump and a soap pump, respectively, to be energized for creating a rinse solution or liquid soap solution with incoming water through said water solenoid valve for feed through said hose to said wheeled self-propelled moveable frame.

7. The apparatus as claimed in claim 6 wherein, said 4-way directional valve includes a depressible plunger for changing the water flow direction through said directional valve for initiating feed of water to said 4-way directional valve, said apparatus includes a front mounted reversing rod mounted on said self-propelled moveable frame having an outboard end, remote from the 4-way directional valve, projecting forwardly of said moveable frame for contact with the vehicle body adjacent the front end of said vehicle body and remote from the open end thereof, and said reversing rod is operatively coupled to said shiftable valve member of said 4-way directional valve whereby, upon contact by said outboard end of said reversing rod remote from its pivot axis with the vehicle body, the reversing rod shifts said valve member to change the water flow direction through said 4-way directional valve and to cause the water flow to switch from said power inlet port to said first supply port, to said second supply port thereby reversing the flow of water to said water cylinder and said drive motor and initiating powered rotation of said spool.

* * * * *